United States Patent [19]

Geier et al.

[11] Patent Number: 5,779,302
[45] Date of Patent: Jul. 14, 1998

[54] DRINKING VESSEL HOLDER FOR VEHICLES

[75] Inventors: Bernd Geier, Grafenau; Gerald Jank, Tübingen; Hermann Gross, Magstadt; Jürgen Löffler, Niefern; Ernst Franz, Filderstadt, all of Germany

[73] Assignee: Mercedes-Benz AG, Germany

[21] Appl. No.: 792,836

[22] Filed: Jan. 30, 1997

[30] Foreign Application Priority Data

Apr. 26, 1996 [DE] Germany ............... 196 167 74.4

[51] Int. Cl.$^6$ ..................................................... A47C 7/62
[52] U.S. Cl. ........................... 297/188.17; 297/188.01
[58] Field of Search ................. 297/188.17, 188.16, 297/188.15, 188.14, 188.01; 248/311.2, 313; 296/37.5, 37.8; 224/275, 280, 281, 549

[56] References Cited

U.S. PATENT DOCUMENTS

| | | | |
|---|---|---|---|
| 4,792,184 | 12/1988 | Lindberg et al. | 297/188.16 |
| 4,854,536 | 8/1989 | Lorence et al. | 248/311.2 |
| 5,104,186 | 4/1992 | Kwasnik et al. | 297/188.16 |
| 5,171,061 | 12/1992 | Marcusen. | |
| 5,232,262 | 8/1993 | Tseng | 297/188.17 |
| 5,297,767 | 3/1994 | Miller et al. | 297/188.17 X |

*Primary Examiner*—Milton Nelson, Jr.
*Attorney, Agent, or Firm*—Evenson, McKeown, Edwards & Lenahan, P.L.L.C.

[57] ABSTRACT

A beverage vessel holder is provided for vehicles having a housing integrated into a vehicle part, such as the dashboard, center armrest or the like. A beverage vessel receiving device is axially slidable in the housing and has insertion openings for the inserting of beverage vessels. A beverage vessel support is pivotally connected to the receiving device and carries a placing surface which supports the beverage vessels on the bottom side below the insertion openings and can be swivelled into the receiving device. For improving the stability of smaller-diameter beverage vessels in the aesthetically attractively constructed beverage vessel holder, the beverage vessel support hat a rectangular plate with at least one cup-shaped insertion indentation constructed therein coaxially with respect to the insertion opening in the receiving device. On two opposite sides in the sliding direction of the receiving device, the plate is in each case pivotally connected on the bottom edge of a transverse web. The transverse webs, in turn, are swivellably held on their upper edge in the receiving device.

20 Claims, 4 Drawing Sheets

DRINKING VESSEL HOLDER FOR VEHICLES

BACKGROUND AND SUMMARY OF THE INVENTION

This invention relates to a drinking vessel holder for vehicles having a housing integrated in a vehicle part, such as a dashboard, a center armrest, a cassette compartment or the like, having a hollow beverage vessel receiving device which is axially movably guided in the housing and which can be pulled out and pushed in and which has on its top side at least one insertion opening for inserting a beverage vessel, such as a cup, a bottle, a can or the like. A beverage vessel support is pivotally connected on the receiving device and carries a placing surface which supports the beverage vessel on the bottom side below the insertion opening and, including the placing surface, can be swivelled into the hollow receiving device.

In the case of a known drinking vessel holder of this type (Document U.S. Pat. No. 5,171,061), two insertion openings for drinking vessels are arranged side by side transversely to the sliding direction of the drinking vessel receiving device. Laterally entered semicircular or C-shaped recesses are provided in the top and bottom wall of the hollow, plate-shaped drinking vessel receiving device. Semicircular rings slide along the circular-arc-shaped surfaces of the recesses, which by means of a tooth and pinion gearing rotate by approximately 180° when the receiving device is pulled out, and slide in front of the openings of the recesses and thereby close the recesses to the two insertion openings. When the receiving device is slid into the housing, the semicircular rings are again pulled flush into the recesses so that they extend in parallel to the circular-arc-shaped interior surfaces of the recesses. The beverage vessel support has a T-shaped construction and is pivotally connected by means of its center leg to the bottom side of the beverage vessel receiving device. When the receiving device is pulled out, the support swivels out of the receiving device because of its own weight and is disposed by means of a transverse web arranged on the end of the center web away from the joint in the area of the insertion openings below the beverage vessel receiving device. The transverse web extends approximately to the center of each insertion opening. During the pushing-in of the beverage vessel receiving device, the center web slides along a stop bevel constructed in the housing, whereby the beverage vessel support is folded on in the direction of the receiving device and finally rests by means of the center and transverse web inside the contour of the receiving device.

Such a beverage vessel holder requires very high constructive expenditures and is therefore relatively expensive to manufacture. It offers a very good and reliable hold to beverage vessels whose diameter is only a little smaller than the clear diameter of the insertion openings. In contrast, in the case of narrower beverage vessels, whose outside diameters deviate extensively from the clear diameter of the insertion opening in the receiving device, there is the danger of a sliding-through during vehicle shocks because the beverage vessel may tilt and, as a result, slide off the transverse web which reaches only partially into the insertion opening.

It is an object of the invention to provide a beverage vessel holder of the initially mentioned type which, because of a simple construction, permits low manufacturing costs, offers a good stability for beverage vessels of different diameters and, in its operative position, offers an aesthetic appearance which meets the requirements of luxury class vehicles.

In the case of a beverage vessel holder of the above-noted type, this object is achieved according to the invention by an arrangement wherein the beverage vessel support has a plate with at least one cup-shaped insertion indentation constructed therein coaxially to the insertion opening, the cup bottom of the insertion indentation forming the placing surface for the beverage vessel, and wherein on opposite sides in the sliding direction of the beverage vessel receiving device, the plate is in each case pivotally connected to the bottom edge of a respective transverse web which is swivellably held on its upper edge in the receiving device.

The beverage vessel holder according to the invention has the advantage of possessing a closed placing surface which covers the whole area of the insertion opening for the beverage vessel and which, in addition, is enclosed all around in the area reaching to the insertion opening situated at a distance above the placing surface. This securely prevents a sliding-off or falling-through of even the smallest and narrow beverage vessels from or through the beverage vessel support. The beverage vessel holder has a simple robust folding mechanism for the swivelling-in and out of the beverage vessel support into the beverage vessel receiving device, which folding mechanism swivels out automatically and is swivelled in manually or, in a restricted manner, by way of a stop bevel arranged on the housing by the slide-in movement of the beverage vessel receiving device.

In the operative position, while the box-shaped beverage vessel receiving device is pulled out of the housing, the beverage vessel holder has an aesthetically attractive appearance. Its closed surface with at least one insertion cylinder, which can be looked into only from above, for a beverage vessel makes a compact solid impression of high-quality work which meets even requirements of the luxury class.

Advantageous embodiments of the beverage vessel holder according to the invention with expedient further developments and embodiments of the invention are described below and in the claims.

According to a preferred embodiment of the invention, the plate of the beverage vessel support has only a small plate thickness, and the at least one insertion indentation is shaped in the downward direction out of the plate having a cup depth which is not much smaller than the height of the beverage vessel receiving device. The two transverse webs, which receive the plate in a flexible manner, are dimensioned such that, in the swivel-out position of the beverage vessel support, the plate remains in the interior of the beverage vessel receiving device and rests directly against its lower edge. This development of the beverage vessel holder according to the invention permits not only a light-weight construction but has an equally important influence on the aesthetic appearance.

According to an advantageous embodiment of the invention, a spring is applied to the beverage vessel support and drives this beverage vessel support in the swivel-out direction out of the beverage vessel receiving device. The spring is preferably constructed as a tension spring which, on one side, is applied to the transverse web situated in the rear in the pull-out direction of the beverage vessel receiving device and, on the other side, is applied to the beverage vessel receiving device itself and places the transverse web on a stop on the beverage vessel receiving device which limits the swivel-out movement of the beverage vessel supporting device. This spring not only accelerates the automatic swivelling-out of the beverage vessel support during the pulling-out of the beverage vessel holder but also holds the support in a fixed position in a force-locking manner so that, despite its hinge joints, it cannot rattle or otherwise shake.

Other objects, advantages and novel features of the present invention will become apparent from the following detailed description of the invention when considered in conjunction with the accompanying drawings.

DETAILED DESCRIPTION OF THE DRAWINGS

Figure 1:
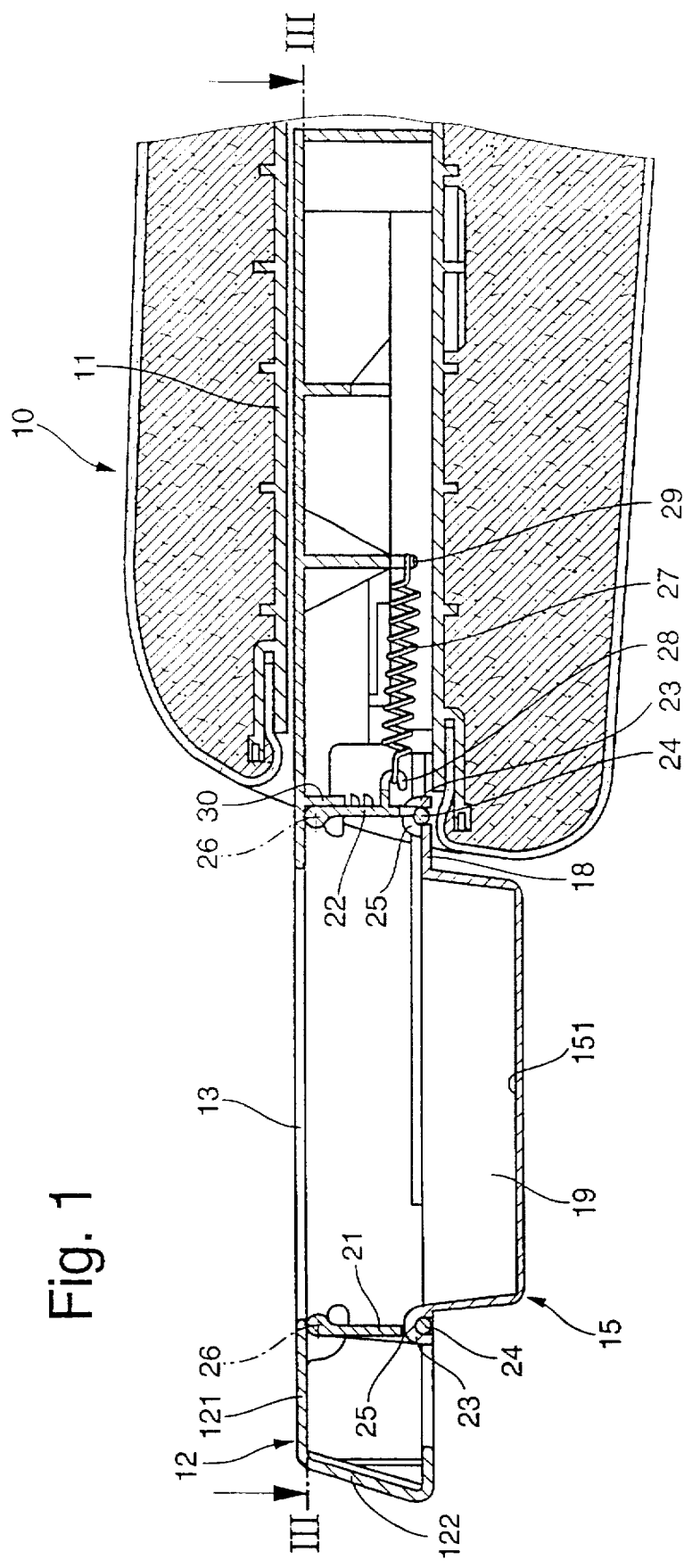
FIG. 1 is a schematic longitudinal sectional view of a beverage vessel holder integrated into the center arm rest of a motor vehicle, constructed according to a preferred embodiment of the present invention and shown in an operative cupholding position.
Figure 2:
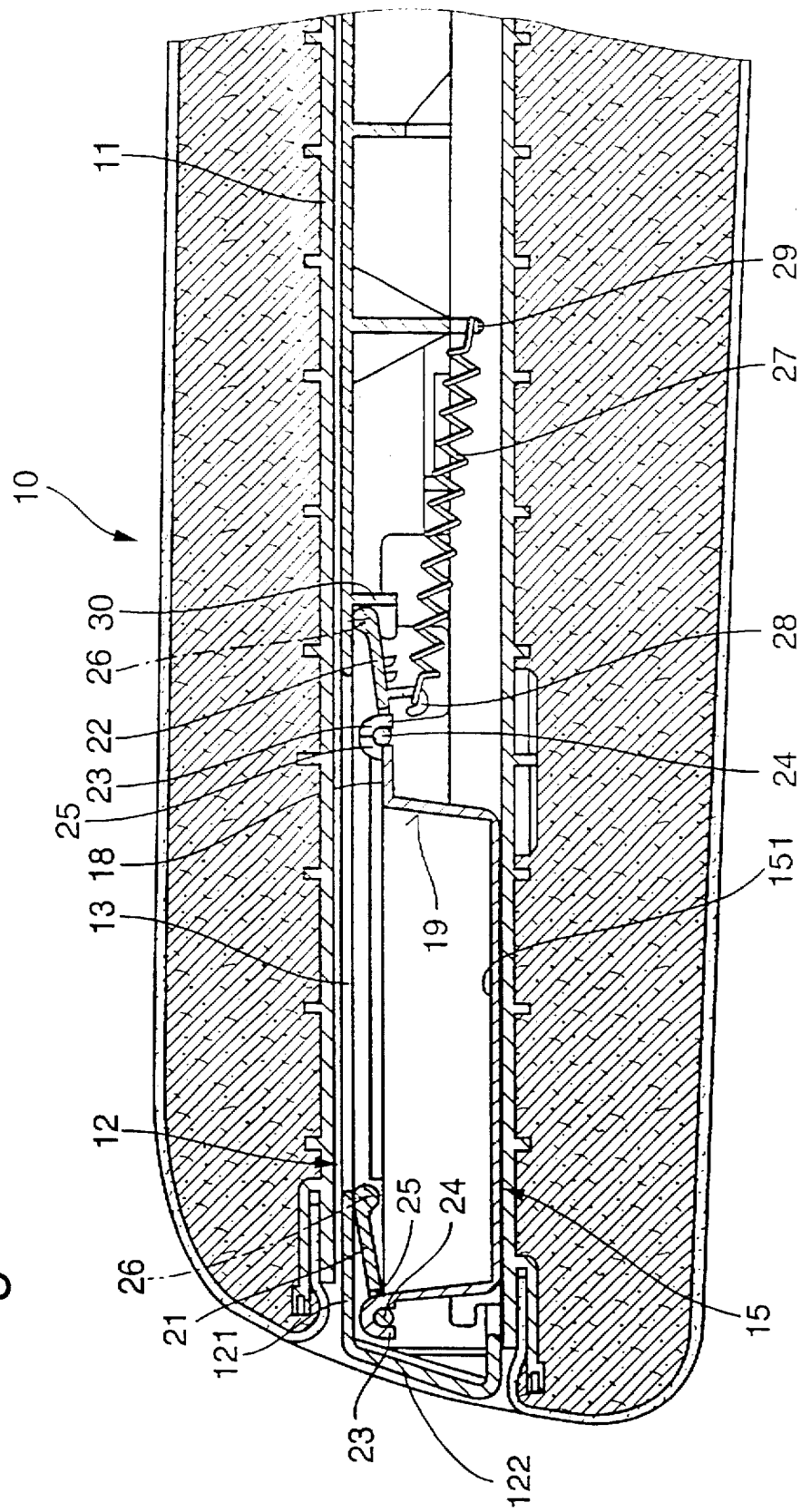
FIG. 2 is a schematic longitudinal sectional view of the beverage vessel holder and center arm rest of FIG. 1, shown in an inoperative closed position.
Figure 3:
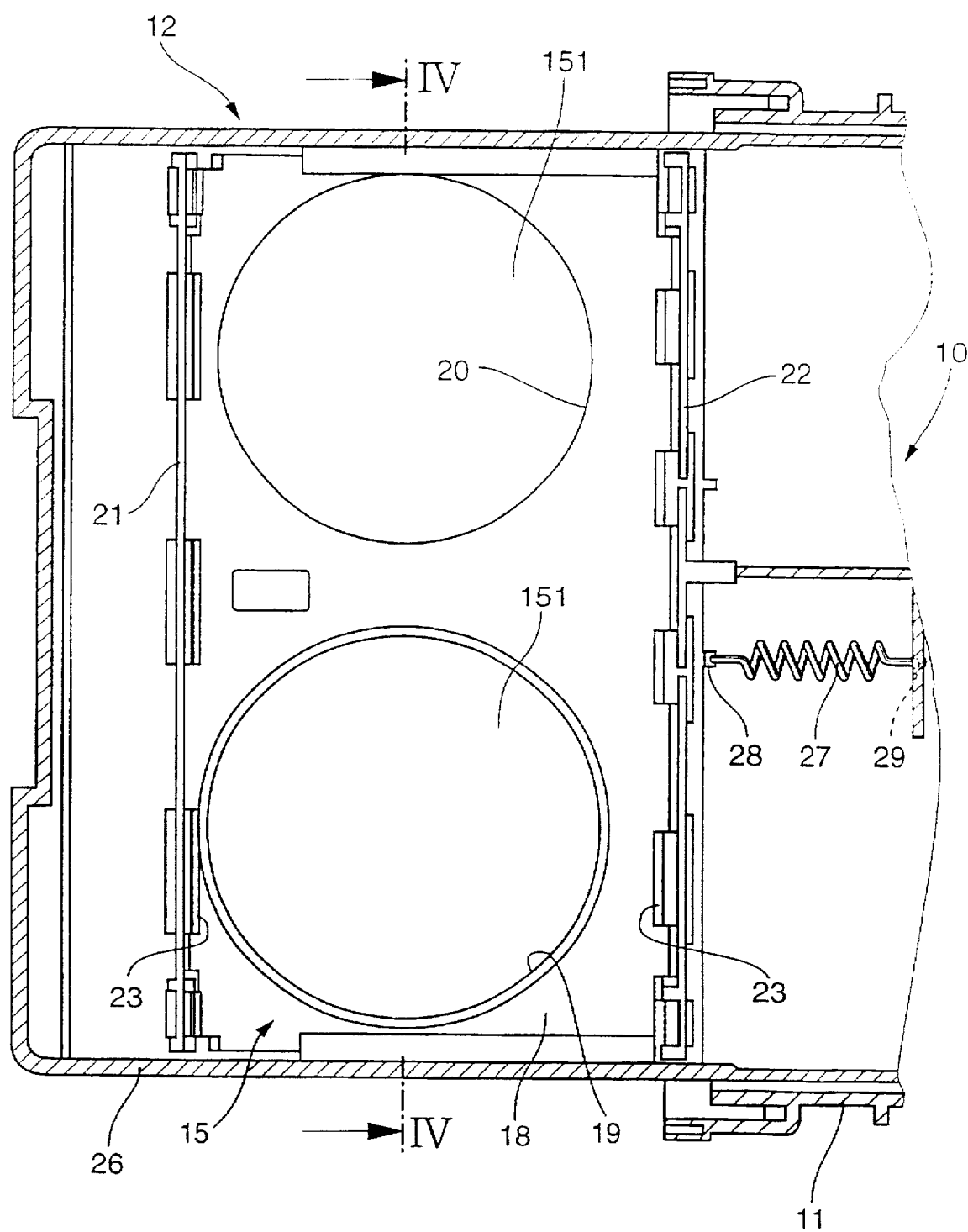
FIG. 3 is a sectional view along Line III—III in FIG. 1.
Figure 4:
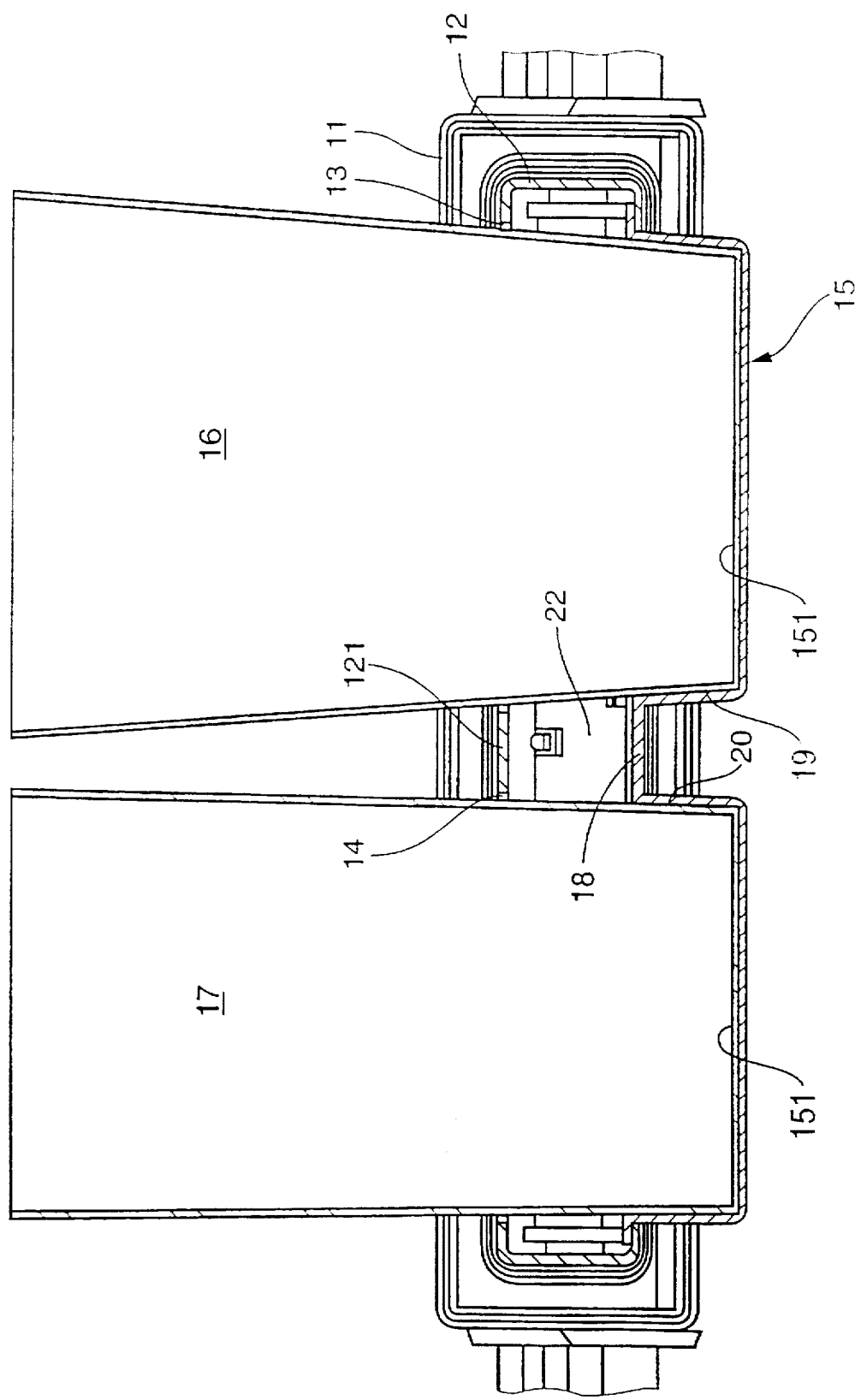
FIG. 4 is a sectional view along Line IV—IV in FIG. 3.

The beverage vessel holder, which in FIGS. 1 and 2 is in each case shown as a longitudinal sectional view and in FIGS. 3 and 4 is shown in different sectional views, is installed in a center armrest 10 between the driver's and the front passenger's seat of a passenger car. In its hollow interior, the swivellable center arm rest 10 accommodates a box-shaped housing 11 in which a beverage vessel receiving device 12 of the beverage vessel holder or so-called cup holder is axially displaceably guided. The hollow beverage vessel receiving device 12 has an approximately U-shaped cross-section, the web of the U-shaped cross-section forming the cross-section of the cover surface 121 of the beverage vessel receiving device 12. The forward face 122 of the beverage vessel receiving device 12 has a closed construction and, when the beverage vessel receiving device 12 is pushed completely into the housing 11, closes off the front-side opening of the housing 11 in the center arm rest 10.

In the forward area of the beverage vessel receiving device 12, two circular insertion openings 13, 14 are placed in the cover surface 121 of the beverage vessel receiving device 12, the diameter of the insertion opening 13 being slightly larger than the diameter of the insertion opening 14 (FIG. 4). In the area of the insertion openings 13, 14, a beverage vessel support 15 is pivotally connected on the beverage vessel receiving device 12, which beverage vessel support 15, when the beverage vessel receiving device 12 is pushed completely into the housing 11, rests inside this beverage vessel receiving device 12 (FIG. 2). When the beverage vessel receiving device 12 is pulled out of the housing 11, the beverage vessel support 15 swivels out of the receiving device 12 in the downward direction (FIG. 1), in which case, by means of a placing surface 151 situated at a distance below the insertion openings 13, 14, it supports on the bottom side beverage vessels 16, 17 placed into the insertion openings 13, 14. For sliding the beverage vessel receiving device 12 back into the housing 11, the beverage vessel support 15 is swivelled back into the beverage vessel receiving device 12 and, together with it, is sunk into the housing 11 inside the center armrest 10.

The beverage vessel support 15 has a rectangular plate 18 of a small plate thickness from which two cup-shaped insertion indentations 19, 20 are shaped out with a cup depth which is not much smaller than the vertical height of the beverage vessel receiving device 12. In this case, the insertion indentations 19, 20 are arranged coaxially with respect to the insertion openings 13, 14 and their clear diameters correspond to the clear diameters of the insertion openings 13 and 14. The cup bottoms of the two insertion openings 19, 20 form the placing surface 151 of the beverage vessel support 15 for the bottom-side supporting of the beverage vessels 16, 17. On sides which are opposite one another in the sliding direction of the beverage vessel receiving device 12, the plate 18 is in each case swivellably held on the bottom edge of a transverse web 21, 22. For this purpose, as indicated in FIGS. 1 and 2, the plate 18 reaches by means of at least one hook-shaped swivel lug 23 over a pin 24 which is constructed on the bottom edge of the transverse web 21 and 22 and which spans the opening of a recess 25 in the transverse web 21 and 22 for the passing-through of the swivel lug 23. The two transverse webs 21, 22, in turn, are pivotally connected to the cover surface 121 of the beverage vessel receiving device 12, specifically by means of their upper edge, which is away from the plate, on the bottom side of the cover surface 121. In FIGS. 1 and 2, the swivel axes on the upper edge of the transverse webs 21, 22 have the reference number 26. The transverse webs 21, 22 are dimensioned such that, in the swivel-out position of the beverage vessel support 15 (FIG. 1), the plate 18 remains in the interior of the receiving device 15 and rests directly against its upper edge. When the beverage vessel support 15 is swivelled into the beverage vessel receiving device 12 (FIG. 2), the two transverse webs 21, 22 are essentially aligned with the plate 18, and the plate 18 and the transverse webs 21, 22 extend directly under the cover surface 121 of the beverage vessel receiving device 12. For the secure swivelling of the beverage vessel support 15 out of the beverage vessel receiving device 12 and for the force-locking holding of the beverage vessel support 15 in its swivelled-out position, a spring constructed as a tension spring 27 is applied to the support 15 in such a manner that the support 15 is driven in the swivel-out direction. For this purpose, the tension spring 27 is hung by means of one spring end in a hook 28 constructed on the rearward transverse web 22 and is hung by means of its other spring end on a pin 29 fastened to the beverage vessel receiving device 12. From the cover surface 121 of the beverage vessel receiving device 12, a stop 30 projects from its underside which stop 30 defines the swivel-out position of the beverage vessel support 15 and on which the rearward transverse web 22 is placed by the tension spring 27 is placed.

If the beverage vessel holder is to be changed from its operative position illustrated in FIG. 1 into its inoperative position illustrated in FIG. 2, the beverage vessel support 15 is to be swivelled against the tension force of the tension spring 27 into the beverage vessel receiving device 12, the two transverse webs 21, 22 in FIG. 1 being rotated clockwise about their swivelling axes 26. When the transverse webs 21, 22 and the plate 18 strike against the bottom side of the cover surface 21 of the beverage vessel receiving device 12, the two insertion indentations 19, 20 are swivelled completely into the receiving device 12, and this receiving device 12, together with the swivelled-in beverage vessel support 15, can be slid completely into the housing 11 of the center armrest 10. At the end of the slide-in movement, the face 122 of the receiving device 12 closes off the opening of the housing 11 flush with the front side of the center arm rest 10. The swivel-in movement of the beverage vessel support 15 into the beverage vessel receiving device 12 can be carried out manually. However, it is also possible to mount a stop bevel on the opening of the housing 11 in such a manner that, when the beverage vessel receiving device 12 is slid in, the beverage vessel support 15 moves against this stop bevel and, as the beverage vessel receiving device 12 is moved farther into the housing 11, is swivelled in a forced manner against the force of the tension spring 27 into the beverage vessel receiving device 12.

For changing the beverage vessel holder from its inoperative position (FIG. 2) into its operative position (FIG. 1), after the release of a locking of the beverage vessel receiving device 12 in the housing 11, the beverage vessel receiving device 12 must be pulled out of the housing 11. The end position of the pull-out movement is determined by a catching between the beverage vessel receiving device 12 and the housing 11 which is not shown here. As soon as the beverage vessel support 15 is released by the housing 11, the tension spring 27 pulls the support 15 out of the receiving device 12 and fixes it in its operative position by a force-locking placing of the rearward transverse web 21 on the stop 30. Now two beverage vessels 16, 17 (FIG. 4) can be inserted through the insertion openings 13, 14 in the insertion indentations 19, 20.

The pull-out movement of the beverage vessel receiving device 12 out of the housing 11 can also take place by means of a spring force if a pressure spring is provided between the rearward end of the receiving device 12 and the housing 11, which pressure spring is tensioned when the beverage vessel receiving device 12 is pushed into the housing 11. When the locking between the slid-in beverage vessel receiving device 12 and the housing 11 is released, the beverage vessel receiving device 12 is automatically changed by the tensioned pressure spring into its operative position.

The invention is not limited to the above-described embodiment. Thus, the beverage vessel holder does not have to be integrated in the center armrest of the vehicle. The beverage vessel holder can also be placed in the dashboard, in a cassette compartment or in other vehicle parts. In each case, the vehicle part must be constructed such that the housing provided for the guiding and receiving of the beverage vessel receiving device and the beverage vessel support can be integrated in this vehicle part.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A beverage vessel holder for a vehicle comprising:
   a housing which is integratable in a vehicle part;
   a hollow beverage vessel receiving device which is axially movably guided in the housing, can be pulled out of and pushed into the housing, and has on a top side thereof at least one insertion opening for inserting a beverage vessel;
   a beverage vessel support which is pivotably coupled on the receiving device, has a placing surface for supporting a beverage vessel below the insertion opening, and, including the placing surface, can be swivelled into the hollow receiving device; wherein
   the beverage vessel support has a plate with at least one cup-shaped insertion indentation constructed therein, which indentation, in a pulled out position of said beverage vessel receiving device, is aligned coaxially to the insertion opening, a cup bottom of the insertion indentation forming the placing surface for the beverage vessel; and
   on forward and rearward sides relative to a sliding direction of the beverage vessel receiving device, the plate is pivotably coupled to a bottom edge of a respective transverse web which is swivellably held on an upper edge thereof in the receiving device.

2. Beverage vessel holder according to claim 1, wherein clear diameters of the insertion opening and of a corresponding insertion indentation are of approximately the same size.

3. Beverage vessel holder according to claim 1, wherein:
   in a surface of the beverage vessel receiving device, two circular insertion openings are arranged side-by-side viewed transversely to a sliding direction of the receiving device; and
   two insertion indentations are provided in the plate of the beverage vessel support which are coaxial to the circular insertion openings.

4. Beverage vessel holder according to claim 3, wherein clear diameters of the side-by-side insertion openings and a corresponding insertion indentation are of different sizes.

5. Beverage vessel holder according to claim 1, wherein:
   the plate is rectangularly constructed and has a small plate thickness;
   the insertion indentation is shaped in the downward direction out of the plate, with a cup depth which is slightly smaller than a height of the beverage vessel receiving device; and
   the transverse webs are dimensioned such that, in the pulled out position of the beverage vessel supporting device, the plate remains in the interior of the receiving device and rests directly against its lower edge.

6. Beverage vessel holder according to claim 5, wherein clear diameters of the insertion opening and of a corresponding insertion indentation are of approximately the same size.

7. Beverage vessel holder according to claim 5, wherein:
   in a surface of the beverage vessel receiving device, two circular insertion openings are arranged side-by-side viewed transversely to a sliding direction of the receiving device; and
   two insertion indentations are provided in the plate of the beverage vessel support which are coaxial to the circular insertion opening.

8. Beverage vessel holder according to claim 5, wherein a spring is applied to the beverage vessel support, which spring which drives a beverage vessel support in a swivel-out direction out of the beverage vessel receiving device.

9. Beverage vessel holder according to claim 8, wherein the spring is constructed as a tension spring which, at one end thereof is applied to a rearward transverse web situated in a rearward position relative to a pull-out direction of the beverage vessel receiving device and, at an opposite end thereof is applied to the receiving device and places the rearward transverse web on a stop on the receiver which stop limits the pulled out movement of the beverage vessel support.

10. Beverage vessel holder according to claim 1, wherein a spring is applied to the beverage vessel support, which spring drives the beverage vessel support in a swivel-out direction out of the beverage vessel receiving device.

11. Beverage vessel holder according to claim 10, wherein clear diameters of the insertion opening and of a corresponding insertion indentation are of the same size.

12. Beverage vessel holder according to claim 10, wherein the spring is constructed as a tension spring which, at one end thereof, is applied to a rearward transverse web situated in a rearward position relative to a pull-out direction of the beverage vessel receiving device and, at an opposite end thereof is applied to the receiving device and places the rearward transverse web on a stop on the receiver which stop limits the pulled out movement of the beverage vessel support.

13. Beverage vessel holder according to claim 12, wherein;

in a surface of the beverage vessel receiving device, two circular insertion openings are arranged side-by-side viewed transversely to a sliding direction of the receiving device; and two insertion indentations are provided in the plate of the beverage vessel support which are coaxial to the circular insertion opening.

14. Beverage vessel holder according to claim 12, wherein clear diameters of the insertion opening and of a corresponding insertion indentation are of approximately the same size.

15. Beverage vessel holder according to claim 14, wherein:

in a surface of the beverage vessel receiving device, two circular insertion openings are arranged side-by-side viewed transversely to a sliding direction of the receiving device; and two insertion indentations are provided in the plate of the beverage vessel support which are coaxial to the circular insertion opening.

16. Beverage vessel holder assembly comprising:

a housing which is fixedly disposable in a passenger vehicle part;

and a beverage vessel receiving device axially movably guided in said housing between an operative exposed and an inoperative concealed position, said beverage vessel receiving device including at least one insertion opening for a vessel and a vessel support with a placing surface supporting a bottom of a vessel when in an in use position holding a vessel; wherein the beverage vessel support has a plate with at least one cup-shaped insertion indentation constructed therein, which indentation, in said operative exposed position of said beverage vessel receiving device is aligned coaxially to the insertion opening, a cup bottom of the insertion indentation forming the placing surface for the beverage vessel; and on forward and rearward sides relative to a sliding direction of the beverage vessel receiving device, the plate is pivotably connected to a respective transverse web which is swivellably held in the receiving device.

17. Beverage vessel holder according to claim 16, wherein a spring is applied to the beverage vessel support, which spring drives the beverage vessel support in a swivel-out direction out of the beverage vessel receiving device.

18. Beverage vessel holder according to claim 16, wherein:

the plate is rectangularly constructed and has a small plate thickness;

the insertion indentation is shaped in the downward direction out of the plate with a cup depth which is slightly smaller than a height of the beverage vessel receiving device; and the transverse webs are dimensioned such that, in a pulled out position of the beverage vessel supporting device, the plate remains in the interior of the receiving device and rests directly against its lower edge.

19. Beverage vessel holder according to claim 18, wherein a spring is applied to the beverage vessel support, which spring drives the beverage vessel support in a swivel-out direction out of the beverage vessel receiving device.

20. Beverage vessel holder according to claim 19, wherein the spring is constructed as a tension spring which at one end thereof is applied to a rearward transverse web situated in a rearward position relative to a pull-out direction of the beverage vessel receiving device and, at an opposite end thereof is applied to the receiving device and places the rearward transverse web on a stop on the receiver which stop limits the pulled out movement of the beverage vessel support.

* * * * *